May 8, 1951  C. T. BREITENSTEIN  2,551,656
REVERSIBLE COUNTER AND INDICATOR
Filed Jan. 24, 1949  3 Sheets-Sheet 1
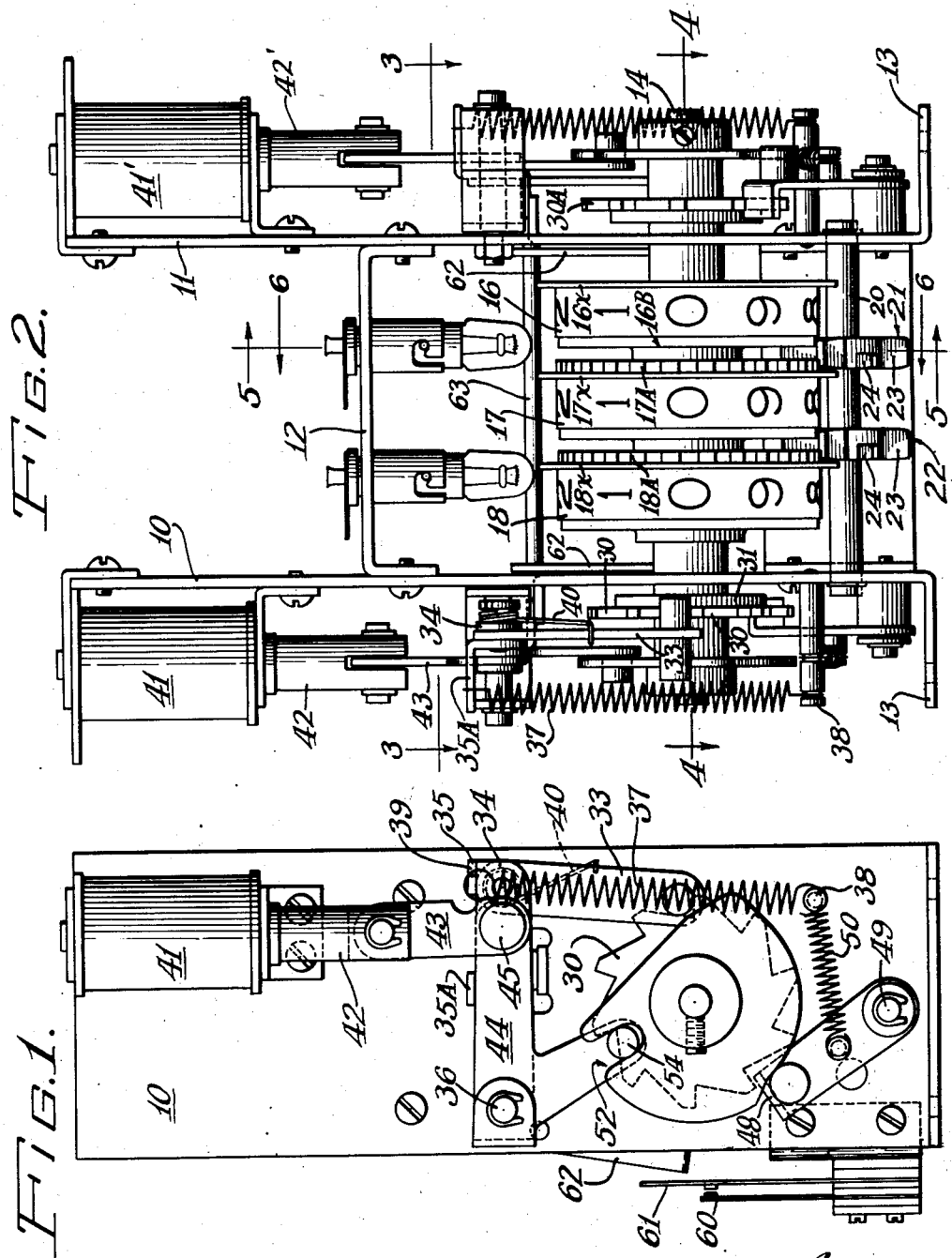
Inventor:
Charles T. Breitenstein
By
Attorney May 8, 1951 C. T. BREITENSTEIN 2,551,656
REVERSIBLE COUNTER AND INDICATOR
Filed Jan. 24, 1949 3 Sheets-Sheet 2
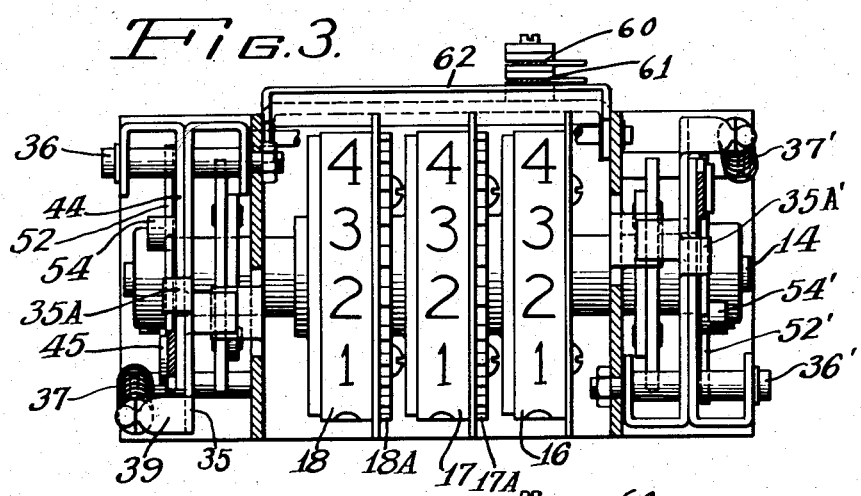
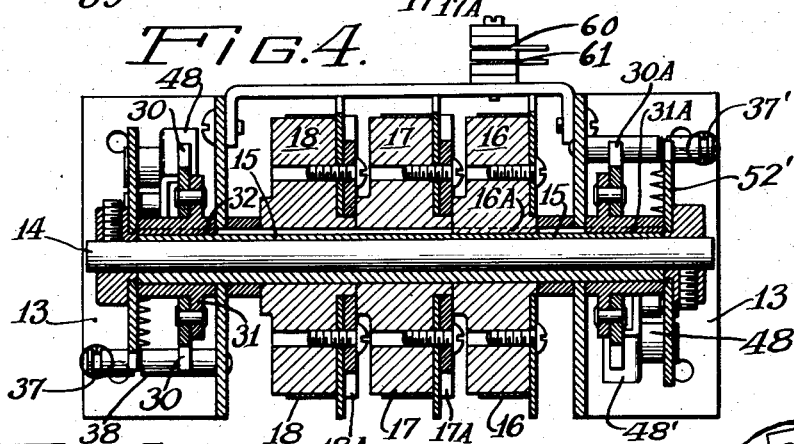
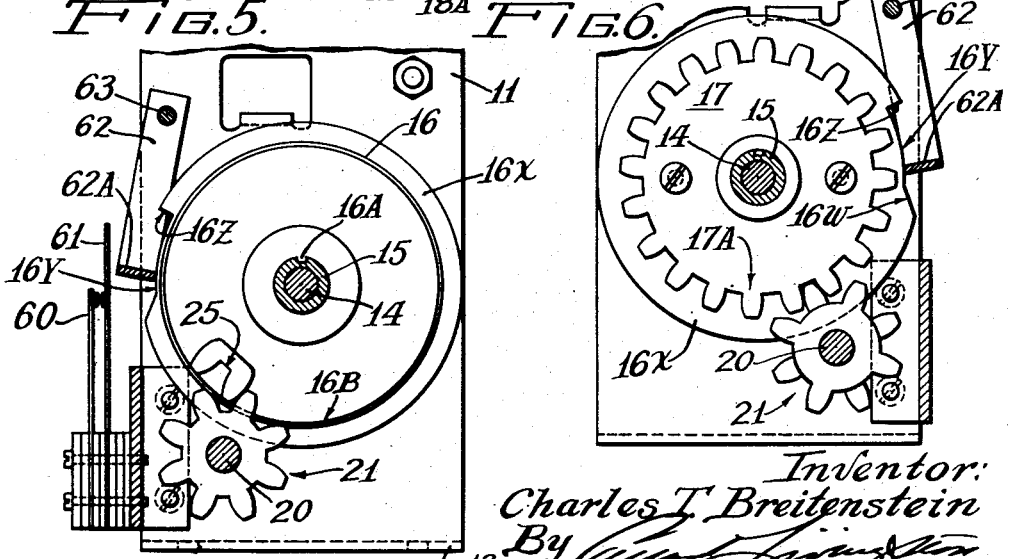
Inventor:
Charles T. Breitenstein
By
Attorney May 8, 1951  C. T. BREITENSTEIN  2,551,656
REVERSIBLE COUNTER AND INDICATOR
Filed Jan. 24, 1949  3 Sheets-Sheet 3

Inventor:
Charles T. Breitenstein
By
Attorney

Patented May 8, 1951

2,551,656

UNITED STATES PATENT OFFICE 2,551,656

REVERSIBLE COUNTER AND INDICATOR

Charles T. Breitenstein, Chicago, Ill., assignor to Raymond T. Moloney

Application January 24, 1949, Serial No. 72,321

15 Claims. (Cl. 235—92)

This invention has as it principal object the provision of improvements in counters and indicating mechanisms.

The invention affords a reversible counting indicator of general application and particularly adapted for use in connection with amusement and game apparatus.

Detailed objects and features of novelty pertain to the provision of a multiple disc or wheel type of indicator including units, tens, hundreds, etc. wheels and drive mechanism therefor for adding or subtracting in step-by-step fashion to an indicated total, the capacity being unlimited and requiring only the addition of multiplying wheels to extend the range.

Further objects relate to the provision of a step-by-step type counter and indicator which cannot possibly make more than one step at a time, and to the provision of an electro-magnetic pawl and ratchet stepping mechanism for procuring additive and subtractive stepping movements, together with means for locking the stepping mechanism for both directions.

Further objects relate to the provision in a mechanism of the class described of a zero stop and means for stopping the wheels at any place mechanically or electrically, for example, at even hundreds.

Another object is the provision of a reverse stepping mechanism for indicators which cannot be caused by jarring or vibration to make more than one step at a time in either direction; to the provision of such a mechanism especially adapted for operation by electro-magnetic solenoids; to the provision of such a mechanism and pawl and ratchet means therefor separately operable to move counting wheels step-by-step in reverse direction, to control cams associated with each stepping means for effecting release of certain holding pawls associated with the companion stepping mechanism whenever the indicator wheels are moved in either of their respective additive or subtractive directions.

Additional objects and aspects of novelty relate to the provision of a compact, reversible, electro-magnetically actuated stepping mechanism and indicator wheels for unlimited totalizing actuated thereby in positive step-by-step motion, not subject to faulty operation resulting from fraudulent or operative jarring, etc., all of which, together with more detailed aspects of novelty in the construction and operation of the embodiment disclosed herein, will become more apparent as the following description proceeds, in view of the annexed drawings, in which:

Fig. 1 is an end elevation of the counter from the hundreds or adding side;

Fig. 2 is a front elevation;

Fig. 3 is a horizontal section looking in the direction of lines 3—3 of Fig. 2;

Fig. 4 is a horizontal section looking in the direction of lines 4—4 of Fig. 2;

Fig. 5 is a fragmentary vertical section taken in the direction of lines 5—5 of Fig. 2;

Fig. 6 is a fragmentary vertical section taken in the direction of lines 6—6 of Fig. 2;

Figure 7:
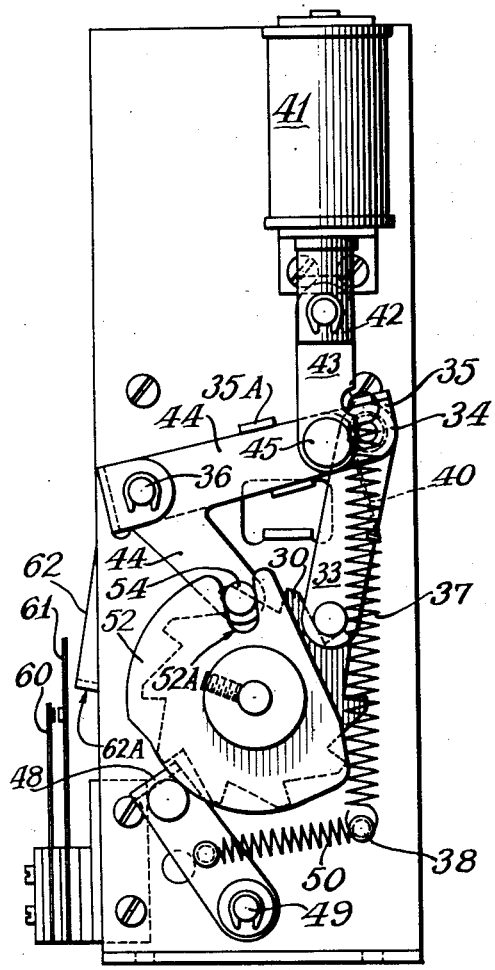
Fig. 7 is an end elevation similar to Fig. 1 showing the stepping mechanism in advancing condition.

The indicator and counter mechanism of the present invention is intended to provide a greater number range with step-by-step advance and retrograde movement than is possible with a type of disc indicator normally used in connection with amusement and game apparatus and such as disclosed in U. S. Patent No. 2,281,262, as one example.

A commercial form of the improved indicator, as illustrated in Fig. 2 herein, comprises a pair of upright end plates 10 and 11, joined by a cross plate 12, and having offset mounting feet 13.

Journaled between these end plates is a compound shaft means including an inner shaft 14 and an outer shaft 15 (see also Figs. 4 and 5), hereinafter described in detail, and which supports a plurality of number wheels or drums 16, 17, and 18, for counting rotation as units, tens, and hundreds wheels with appropriate number indicia thereon.

As depicted in Figs. 4 and 5, the first or units wheel 16 is fastened by means of key 16A with the outer shaft 15 for rotation therewith, while the remaining multiplier wheels 17, 18, etc., are not keyed, but float on shaft 15 and are operatively coupled with the first wheel through a form of Geneva drive, which includes (Fig. 2) a counter shaft 20 on which float Geneva gears 21 and 22 having alternate full teeth 23 and 24, while the units wheel 16 is provided (as shown in Fig. 5) with a single transfer tooth 25, situated in its periphery 16B (Fig. 2) for engagement with teeth 21 of the associated Geneva gear.

The succeeding tens, hundreds, etc. wheels 17 and 18 are provided with gear teeth 17A and 18A respectively situated to mesh with the teeth of the adjacent Geneva gear as depicted in Fig. 6. The operation of the foregoing multiplying or additive wheel drive is such that every tenth step of the units wheel 16 causes the tens wheel 17 to advance one digit; and, likewise, every tenth step of the tens wheel causes the hundreds wheel 18 to advance one digit through the agency of the Geneva transfer, or drive, in a manner commonly understood in the art.

Means for advancing the indicator reels is shown in Fig. 1 to include a ratchet wheel 30 pinned to hub 31 (Fig. 4) on the outer shaft 15 and keyed to the latter, as at 32, there being an identical but reversibly acting ratchet means 30A, at the opposite end of the unit and also keyed to shaft 15, as at 31A, Fig. 4.

A driving pawl means includes a dog 33 (Fig. 1) pivoted as at 34 on a rocker arm 35, pivoted in turn on pin 36, and a driving spring 37 anchored on its lower end on pin 38, with its upper end engaging an offset lug 39 on rocker arm 35, normally pulling the driving pawl downwardly to rotate the ratchet 30 clockwise in Fig. 1, there being a keeper spring 40 looped on the pivot pin 34 to urge the nose of the driving pawl into the ratchet teeth.

Means for elevating the rocker 35 includes an electromagnetic solenoid 41 on the frame and having its plunger 42 connected with link 43 to a cam operating lever or rocker 44 also mounted on pin 36. The ratchet rocker 35 has an offset lug 35A which overlies the rocker arm 44, such that when the solenoid 41 is energized and plunger 42 is attracted upwardly and the cam rocker 44 is pulled upwardly owing to its pivotal connection 45 with link 43, and said rocker in turn bears against the lug 35A and also raises the rachet rocker 35 into the condition depicted in Fig. 7, so that the driving pawl dog 33 is raised to engage the next succeeding tooth in the ratchet, and so soon as the solenoid is deenergized and the rocker arms are free to lower to normal position, the spring 37 will positively drive the ratchet pawl and the cam rocker downwardly from the position of Fig. 7 to the normal position of Fig. 1, thus advancing the ratchet 30 and hence the outer shaft 15 one step.

Since the units wheel 16 is keyed to shaft 15, it will likewise take one step.

Retrograde motion of the ratchet wheel 30 is normally prevented by a holding pawl 48 (Fig. 1) pivoted on the frame as at 49 and yieldingly urged into engagement with the ratchet teeth by spring 50.

Figure 8:
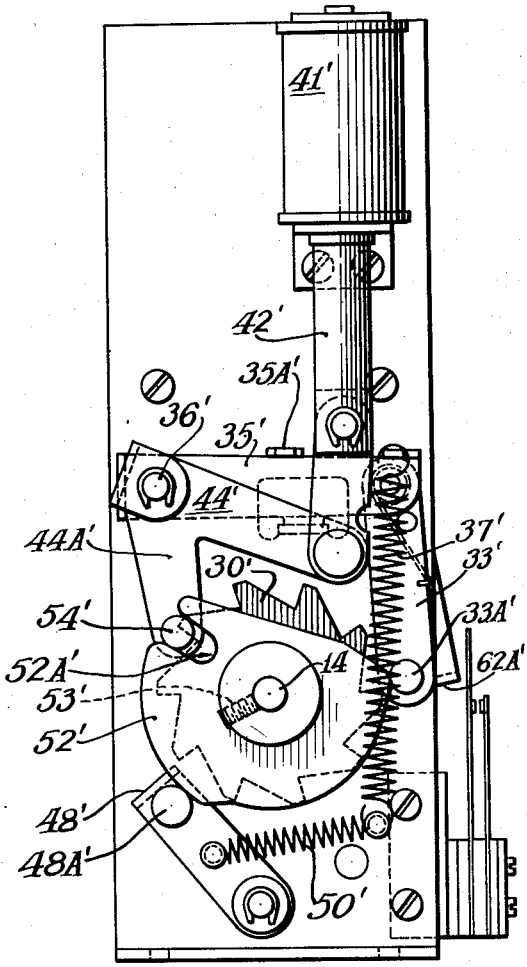
Fig. 8 is an end elevation of the units end of the unit opposite from that of Fig. 7 and showing the simultaneous condition of operation of the stepping mechanism.

As shown in Fig. 8, a substantially identical actuating mechanism is provided for effecting reverse or subtractive movement of the indicating wheels, including a solenoid 41' drivingly connected with a cam rocker 44' to actuating pawl rocker 35', and associating driving pawl dog 33' for stepping the ratchet wheel 30'. In the latter view the reference characters having prime subscripts are intended to indicate parts identical as described in view of Fig. 1 or 7, particularly, it being pointed out, however, that the condition of the parts as illustrated in Fig. 8 represents the action thereof in response to the operating condition simultaneously portrayed in Fig. 7.

Thus, when the mechanism is in the condition of Fig. 7, pursuant to effecting an advance of the wheels, the reverse action is occurring in the condition of Fig. 8, and it is important to note that the ratchet wheel 30' of Fig. 8 must be permitted to move in a reverse direction with respect to its movement when driven by the dog 33'.

Accordingly, it is necessary to effect a withdrawal of the retrograde holding pawl 48' into the condition shown in Fig. 8, and to this end there is provided a releasing cam 52' fast on the inner shaft 14 by means of set screw 53', said cam being especially evolved to perform the operations hereinafter specified, including a release of the holding pawl through the agency of pin 48A', which rides on the cam edge.

Means for actuating the release cam includes a pin 54' on an arm 44A' of the cam rocker 44', which pin works in a radial slot 52A' of the cam.

Thus, when the mechanism is stepping in an additive sense, in accordance with the showing of Fig. 7, the cam 52' rotates in an anti-clockwise direction in Fig. 8, thereby camming out the holding pawl 48' to non-holding position, and depressing the cam rocker 44', since shaft 14 of Fig. 8 must move in a reverse sense from its motion, as viewed in Fig. 7.

The driving pawl or dog 33' is provided with a lateral pin 33A' projecting from both faces of the driving pawl dog or lever 33', so that on the innermost side of the latter the pin rests in the teeth of the ratchet wheel, while on the outermost face said pin rides the edge of the cam 52' on which there is a rise 52B' serving to displace the pin 33A' toward the right in Fig. 8 and thereby disengaging the remaining part of said pin from the ratchet teeth as shown.

If now it is assumed that a subtractive or retrograde motion of the wheels is desired, the solenoid 41' would be energized so that the parts of the actuating mechanism shown in Fig. 8 would assume the conditions of the parts of Fig. 7, and vice versa; in other words, the hold pawl 48 would be disengaged in the manner of the pawl 48' and the driving pawl 33 would be disengaged in the manner of the pawl 33'. Thus, when the driving means is actuated for a given direction of movement of the wheels, the holding and driving mechanism for effecting the reverse action is released by the aforesaid cam means and impositive driving connections between the two rocker shafts 35 and 44 on the one hand, and 35' and 44' on the other, the aforesaid impositive drive meaning the coaction of the two rocker arms in each set through the agency of the corresponding lug means 35A or 35A'.

A zero control means is provided in the form of a leaf spring switch including normally open contact blades 60 and 61 mounted as shown in Fig. 1, there being an operating bail 62 pivoted on a cross pin 63 (Fig. 2) and having its bight portion or horizontal bar 62A (Fig. 5) adapted to ride on a peripheral flange portion of each drum or wheel, for example, the flange 16X of Fig. 5.

A notch 16Y is formed in the flange at a depth to permit the bar 62A of the bail to drop away from switch blade 61 and permit the switch to assume the open circuit condition shown in Fig. 5, it being understood that each of the indicator wheels is provided with a similar flange 17X or 18X (Fig. 2) with a correspondingly formed notch portion (not seen) and that all said notches must be aligned before the bail bar 62A, can drop away from the switch to open the latter.

Thus, the first step of the units wheel 16 away from zero will carry the flange notch away from the bail bar, causing the latter to ride on the periphery of flange 16X, and thereby rock the bail clockwise (Fig. 5) or anti-clockwise (Fig. 6), so that the bar 62A will press against switch blade 61, closing the latter with its companion blade 60 until such time as the control notches in the several wheel flanges shall again be in alignment to permit the bail to drop back.

It will be apparent that the control notches in the wheels after the units wheel may be located in any angular position to cause said wheels to stop at desired indications, for example at even hundreds.

Attention is called to the fact, as appears in Fig. 6, that the notch 16Y has a radial stopping edge 16Z which is effective to stop the wheel against the bail bar 62A in the retrograde or zeroizing motions of the wheel, and this stop edge leads as the wheels rotate or advance in additive motion. However, each notch is provided with a trailing edge 16W, Fig. 6, which is not radial but is angled to cam the bail bar out in the advance of notches of the wheels.

If the camming edge portions 16W of the control notches are made more or less radial like the edges 16Z, or if said stopping and camming edges in the respective notches are reversed, additional control action will result. In such cases supplemental control means may be added for retracting the control bail at will, as described hereinafter.

If desired, the holding pawls 48 and 48' may be omitted, these being desirable, however, where the wheels are to be stepped at high speeds, and also for the purpose of preventing possible fraudulent interference with the operation of the device by the use of wire feelers and the like where the novel indicators are utilized in conjunction with score tallying or reward totalizing.

The construction is such that a large number of multiplying wheels may be used without unduly loading the driving mechanism, which takes advantage of an overhead operation of the solenoid plungers to operate the ratchets on the downstroke, aided by the spring means 37 or 37'.

Since the driving or advancing action of the ratchet pawls is effected by the springs 37 or 37', it will be apparent that when all of the wheels are stopped at zero or maximum indication repeated energization of the advance solenoid 41 will have no effect and cause no injury to the parts, since said springs will take up any shock due to immobility of the corresponding ratchet wheel to move.

Figure 9:
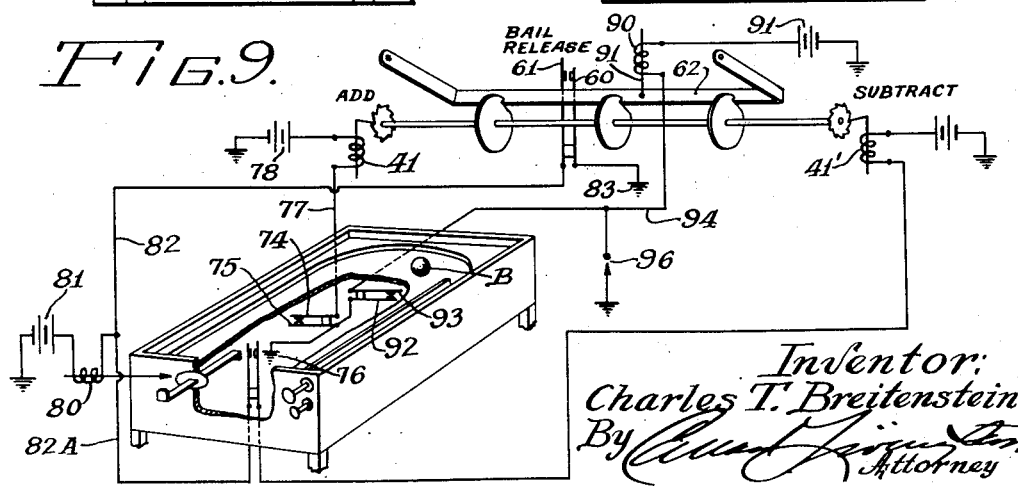
Fig. 9 is a circuit diagram.

The circuit of Fig. 9 illustrates one application of the counter to an amusement apparatus of the coin-controlled variety which commonly includes a cabinet portion 70, a reciprocal coin slide 71 operable to release the game for play when a proper coin is placed therein, a knob 72 operable to elevate a ball to shooting position, and a ball shooter 73 for launching the ball B onto the playing field where it will engage one or more ball targets or bumpers in a commonly understood manner.

In the foregoing arrangement, the counter mechanism is illustrated schematically to show its least parts, with circuit connections to cause the indicator to advance when a ball scores a hit on a certain bumper switch and thereby cause the zero control bail to condition the game for playing without the use of a coin thereafter by electromagnetically unlocking the coin slide, together with connections for causing a subtraction of indication whenever the coin slide is operated with the zero switch closed.

If it is assumed that the ball B scores a hit on the particular switch having contact blades 74 and 75 to close the latter, a circuit is thereby closed from ground 76 via conductor 77 to energize the advancing or adding coil 41 from its power source or battery 78.

When the first counter reel or wheel leaves zero position, it will be recalled that the control bail is thereby rocked out of the aligned notches in the several wheels and closes the zero or control switch contacts 60 and 61, which, in the circuit of Fig. 9, will energize the coin-slide unlocking or releasing coil 80 from its power source 81 via conductor 82 and said contacts 60 and 61 to ground 83.

It will appear that if only one step has been taken from zero by the digits wheel, the coin-slide release will be operated in unlocked condition for only one operation if the counter is caused to subtract one digit for each operation of the coin slide in unlocked condition. Accordingly, whenever the coin-slide unlocking coil 80 is energized by closed condition of the zero or bail switch, there will be an operating ground on conductor 82 and therefore on the extended connection 82A therefrom to coin slide switch contact 85, which will close circuit with its companion contact 86 responsive to each operation of the coin slide 71, thereby extending said operating ground via conductor 87 to the subtract coil 41' for energization of the latter from its power source 88.

In practice, some ball targets or switches are arranged to cause the score indicator or register to take several or a large number of steps, and under such conditions, it will be apparent that the coin slide as connected in Fig. 9 can be operated to free the game for play as many times as there are accumulated additive steps stored in the indicator wheels. If the digits wheel had been caused to advance from zero a total of five steps by any scoring of a ball, then the coin slide 71 could be operated five times without a coin, or until the zero switch were opened by five retrograde steps of the wheels to full zero condition.

A further arrangement illustrated in Fig 9 provides for a supplemental control to include means such as the electromagnet 90 having an armature connection 91 to the zero bail 62 to rock the latter for operation of control switch 60—61 regardless of the position of the wheels, whether at zero with the notch arrangement heretofore explained, or with some other predetermined notch dispersal.

Such operation of the zero switch bail may be effected by closure of a switch, such as the ball-operated switch having contacts 92 and 93, which will apply an operating ground via conductor 94 to the bail coil 90 to energize the latter from its power source 91. It will be understood that the switch means 92—93 may be a manual switch instead of a ball-operated switch, or a manual switch 96 may be provided for optional use.

I claim:

1. An indicator comprising an indicating wheel mounted for additive and subtractive stepping, separate pawl and ratchet means operable respectively to effect relatively oppositely directed stepping of said wheel, a yieldable pawl dog for each said ratchet means, means for separately actuating either pawl and ratchet means, and release cam means cooperable with said pawl and ratchet means and said dogs and acting to move either dog out of engagement with its corresponding ratchet means responsive to operation of the companion pawl and ratchet means.

2. An indicator comprising an indicating wheel mounted for reversely directed stepping motions, separate pawl and ratchet means operable respectively to effect stepping of said wheel in opposite directions, a yieldable holding pawl for each said ratchet means, and release cam means cooperable with said pawl and ratchet means and said holding pawls to move either holding pawl out of engagement with its corresponding ratchet means responsive to operation of the companion pawl and ratchet means.

3. Indicating mechanism comprising coacting indicating wheels mounted for reversely directed stepping motions for additive and subtractive indication, separate dog and ratchet means operable respectively to effect stepping of said wheels in relatively reverse directions corresponding to additive or subtractive motions, a yieldable holding pawl for each said dog and ratchet means, said dog means being yieldingly held in operative relation with the corresponding ratchet means, a release cam for each dog and ratchet means, each said cam being mounted for directionally reverse camming operation relative to the other concomitantly with and by stepping operation of either dog and ratchet means, said cams respectively cooperating with corresponding holding pawls and dogs to move the same in a direction out of operative engagement with the corresponding ratchet means as a result of stepping operation of the companion ratchet means.

4. Mechanism as set forth in claim 3 and further characterized in that said indicating wheels are mounted on an outer shaft which is keyed with said ratchet means, and said cams are keyed with an inner shaft concentric with said outer shaft, and said cams are driven through driving connections with the corresponding dog and ratchet means.

5. Mechanism as set forth in claim 4 and further characterized in that said driving connections comprise, in association with each ratchet means, a rocker lever driving a corresponding cam and a rocker lever driving the corresponding dog, together with impositive coupling means for each pair of said rocker levers and acting to couple said levers, respectively, for movement in the same direction but not in opposite directions.

6. An adding and subtracting counter and indicator including indicator wheels, outer shaft means mounting said wheels for reverse motions, a pair of ratchet wheels keyed with said shaft to step the same in reverse directions, pawl means for separately driving said ratchet wheels, actuating means for said pawl means, and inner shaft means within said outer shaft means and having fast thereon releasing cam means cooperable with said pawl means for each said ratchet wheel and operating reversely to disengage the pawl means from one ratchet wheel during driving motion of the other ratchet wheel by its corresponding pawl means.

7. In a reversible indicator, an indicating wheel, compound shaft means including an outer and an inner shaft, said wheel keyed with said outer shaft, reversely pitched ratchet wheels also keyed with said outer shaft, driving pawl means for each ratchet wheel and including respectively a pivoted ratchet dog spring-urged into driving engagement with the corresponding ratchet wheel, a cam associated with each said ratchet wheel and keyed with said inner shaft, a cam rocker associated with each said driving pawl means for rocking the associated cam concomitantly with actuation of the corresponding driving pawl means whereby said inner shaft and cams are rocked simultaneously with each movement of said wheel by said driving pawl means in either direction, said cams being reversely evolved with respect to each other and each acting on the associated dog to pivot the latter out of the way of the associated ratchet wheel if the angular motion of said ratchet wheel is retrograde or opposite from its driving motion.

8. Mechanism as set forth in claim 7 and further characterized by the provision of a yieldable holding pawl for each said ratchet wheel, each said pawl coacting with the corresponding cam to be moved by the latter into non-holding position responsive to retrograde motion of said cam.

9. In an indicator, stepping mechanism for reverse drive comprising an outer reversely stepping shaft adapted to drive an indicator member in opposite directions in additive and subtractive steps, a second shaft rotatable within the outer shaft, reversely pitched ratchet wheels keyed with said outer shaft, a pawl rocker for each ratchet wheel, a stepping dog pivoted on each rocker and yieldingly urged into driving engagement with a corresponding ratchet wheel, a holding dog yieldingly engaged with each ratchet wheel, a release cam adjacent each ratchet wheel and fast on said second shaft, a cam rocker for each cam and pivoted adjacent the corresponding pawl rocker, means for coupling the pawl and cam rockers of each pair for joint motion only in one direction, means drivingly interconnecting each cam rocker with its corresponding release cam, said release cams coacting with the corresponding stepping and holding dogs to disengage both of the latter from the corresponding ratchet wheel to permit the latter to move in a retrograde sense whenever the companion ratchet wheel is stepped in the opposite sense.

10. Mechanism as defined in claim 9 and further characterized by the provision of an actuating solenoid for each ratchet wheel, said solenoids each having a driving plunger linked with the corresponding cam rocker, and spring means urging each cam rocker in reverse direction from its movement by the corresponding solenoid.

11. Mechanism as set forth in claim 10 and further characterized by the provision of an indicating wheel on said outer shaft and having a zero notch, a zero switch, and a zero switch operator riding said wheel and opening said switch when lodged in said zero notch, together with separate energizing circuits for said solenoids, a manual switch in that particular one of the solenoid circuits serving to actuate the subtractive ratchet means, said zero switch being connected with said manual switch and particular solenoid circuit to render the latter ineffective so long as said indicating wheel remains at zero position.

12. In an indicator, stepping mechanism for reverse motion comprising an outer reversely stepping shaft adapted to drive an indicator member in additive and subtractive steps, a second shaft rotatable within the outer shaft, relatively reversely pitched ratchet wheels keyed with said outer shaft, a pawl rocker for each ratchet wheel, a stepping dog pivoted on each rocker and yieldingly urged into driving engagement with a corresponding ratchet wheel, a holding dog yieldingly engaged with each ratchet wheel, a release cam adjacent each ratchet wheel and fast on said second shaft, a cam rocker for each cam and pivoted adjacent the corresponding pawl rocker, means for coupling the pawl and cam rockers of each pair for joint motion only in one direction, means drivingly interconnecting each cam rocker with its corresponding release cam, said release cams coacting with the corresponding stepping and holding dogs to disengage both of the latter from the corresponding ratchet wheel to permit the latter to move in a retrograde sense whenever the companion ratchet wheel is stepped in the opposite sense, an actuating solenoid for each ratchet wheel, said solenoids each having a driving plunger linked with the corresponding cam rocker, and spring means urging each cam rocker in reverse direction from its movement by the corresponding solenoid, and a plurality of totalizing wheels driven through said outer shaft, peripheral rim portions on said wheels, a control notch having leading and trailing ends in each said rim portion, a control member riding said rim portions for movement into and out of said notches in predetermined conditions of alignment thereof with respect to the angular displacement of all of the wheels, said leading and trailing ends being formed as cams or radial stopping formations with respect to said control member whereby said wheels may be stopped in predetermined conditions of alignment when rotated in one direction and permitted to move freely when rotated in the opposite direction.

13. In a totalizer, at least one number wheel, shaft means for the wheel, a pair of ratchet wheels fast with said shaft means and having relatively reversed ratchet teeth, pawl means drivingly coacting with said ratchet wheels and selectively operable to effect indicating movements of said number wheel in relatively opposite directions, holding means cooperable with each ratchet wheel to prevent retrograde motion thereof, a second shaft coaxial with said first-named shaft means, and a pair of releasing members fast on said second shaft and each positioned near one of said ratchet wheels for cooperation with the corresponding holding means and each directionally oriented such that when either ratchet wheel is moved by said pawl means to effect its corresponding directional movement of the number wheel, the releasing member associated with the other ratchet wheel will be operated thereby to release the corresponding holding means to permit a relatively retrograde motion of the ratchet wheel associated with the holding means thus released.

14. In an indicator, at least one number wheel rotatable in opposite directions, a drive shaft coupled to said number wheel, a pair of reversely pitched ratchet wheels coupled to said drive shaft, a stepping pawl for each ratchet wheel, a holding pawl for each ratchet wheel and normally engaged therewith to prevent retrograde motion thereof, a cam shaft adjacent said drive shaft, a pair of releasing cams coupled with said cam shaft, each said cam being associated with one pair of said stepping and holding pawls and each cam being operable to release its corresponding holding pawl, at least, when the stepping pawl for the other ratchet wheel is actuated in stepping operation, stepping means for separately actuating said stepping pawls, and means actuated by said stepping means for rocking the corresponding releasing cam to impart rocking motion to the other releasing cam for effecting release of the other holding pawl, at least, whereby to permit reverse motions of the ratchet wheel associated with said other holding pawl.

15. An indicator according to claim 14 in which both pairs of stepping and holding pawls are normally engaged in the teeth of their respective ratchet wheels, and said releasing cams are each operable when turned in one direction to effect release of both pawls associated therewith from the corresponding ratchet wheel.

CHARLES T. BREITENSTEIN.

REFERENCES CITED

The following references are of record in the file of this patent:

UNITED STATES PATENTS

| Number | Name | Date |
| --- | --- | --- |
| 1,985,736 | Bellah | Dec. 25, 1934 |
| 2,072,933 | Williams | Mar. 9, 1937 |
| 2,219,636 | Schwartz | Oct. 29, 1940 |
| 2,281,262 | Breitenstein | Apr. 28, 1942 |
| 2,368,874 | Poole | Feb. 6, 1945 |